United States Patent
Lin et al.

(10) Patent No.: US 7,831,741 B2
(45) Date of Patent: Nov. 9, 2010

(54) INDEXING DEVICE AND METHOD FOR DATA STORAGE SYSTEM

(75) Inventors: Wu Yuan Lin, Hsinchu (TW); Yu Ming Chen, Hsinchu (TW)

(73) Assignee: Promise Technology, Inc., Hsinchu (TW)

( * ) Notice: Subject to any disclaimer, the term of this patent is extended or adjusted under 35 U.S.C. 154(b) by 378 days.

(21) Appl. No.: 12/060,627

(22) Filed: Apr. 1, 2008

(65) Prior Publication Data

US 2009/0144453 A1 Jun. 4, 2009

(30) Foreign Application Priority Data

Nov. 30, 2007 (TW) .............................. 96145512 A

(51) Int. Cl.
*G06F 3/00* (2006.01)

(52) U.S. Cl. .................... 710/5; 709/216; 709/217; 709/218; 709/219; 709/223; 709/238; 710/3; 710/4; 710/8; 710/62; 711/100; 711/101

(58) Field of Classification Search .............. 709/216, 709/217, 218, 219, 223, 238; 710/3, 4, 5; 711/100, 101
See application file for complete search history.

(56) References Cited

U.S. PATENT DOCUMENTS

| | | | | |
|---|---|---|---|---|
| 6,477,165 | B1 * | 11/2002 | Kosco | 370/389 |
| 2006/0015655 | A1 * | 1/2006 | Zur et al. | 710/5 |
| 2008/0098106 | A1 * | 4/2008 | Mimatsu | 709/223 |
| 2009/0077554 | A1 * | 3/2009 | Reed et al. | 718/101 |

* cited by examiner

*Primary Examiner*—Tariq Hafiz
*Assistant Examiner*—Jasjit S Vidwan

(57) ABSTRACT

The invention discloses an indexing device for a data storage system which comprises a plurality of data storage devices. The indexing device generates an I/O descriptor index number according to a target data storage device, where the I/O descriptor index number corresponds to a device ID number and a queued command tag number. After receiving from the target data storage device an information packet containing the queued command tag number and a second connection request data frame including the device ID number, the indexing device can calculate the I/O descriptor index number according to the device ID number and the queued command tag number.

15 Claims, 2 Drawing Sheets

INDEXING DEVICE AND METHOD FOR DATA STORAGE SYSTEM

BACKGROUND OF THE INVENTION

1. Field of the Invention

The invention relates to an indexing device for a data storage system, and more particularly, to an indexing device for rapidly indexing an input/output (I/O) descriptor.

2. Description of the Prior Art

The amount of digital data nowadays is getting bigger and bigger that's why the data storage system capable of storing large amount of digital datum is taken seriously. The Serial Attached Small computer system interface (SAS) data storage system can comprise a plurality of data storage devices to increase the capacity of data storage system, or further enhancing its efficiency and security with Redundant Array of Independent Drives (RAID).

In additional, the SAS data storage system can be used in compliance with SAS data storage device and Serial Advanced Technology Attachment (SATA) data storage device, so as to increase its extension and selectivity more flexibly.

When a host device sends a host I/O command to a controller of the SAS data storage system, the controller, according to the host I/O command, generates I/O descriptors respectively corresponding to the data storage devices. According to the I/O descriptors, the controller generates I/O commands and then transmits the I/O commands to the data storage devices correspondingly. After executing the I/O command, the data storage device transmits an I/O response corresponding to the I/O command to the controller, so as to execute the following I/O processing procedures, such as Direct Memory Access (DMA), and so on. At the same time, the controller must retrieve the I/O descriptor corresponding to the I/O response, so as to execute the following I/O processing procedures based on the I/O descriptor.

However, the SAS data storage system can comprise a plurality of data storage devices, and some data storage devices can buffer a plurality of queued I/O commands. Therefore, the controller can transmit a lot of I/O commands within a short time. For this reason, when the controller receives an I/O response from the data storage device and retrieves the I/O descriptor corresponding to the I/O response, a fast and efficient indexing method is required to ensure the process efficiency of the system. However, the SAS standard does not provide the indexing method for retrieving the I/O descriptor corresponding to the I/O response.

Accordingly, the main scope of the invention is to provide an indexing device and method for a data storage system to solve the aforementioned problems.

SUMMARY OF THE INVENTION

A scope of the invention is to provide an indexing device and method for a data storage system. According to an information packet with a queued command tag number and a second connection request data frame with a device ID number, the invention calculates an I/O descriptor index number corresponding to an I/O descriptor. Thereby, when receiving an I/O response, the data storage system can rapidly index the I/O descriptor corresponding to the I/O response.

According to an embodiment of the invention, the indexing device is used for a data storage system, wherein the data storage system comprises a plurality of data storage devices. The indexing device comprises a memory module, an I/O processing module, and a controller module. The I/O processing module generates the I/O descriptor and the I/O descriptor index number corresponding to the I/O descriptor based on a target data storage device, wherein the I/O descriptor index number is corresponding to the device ID number and the queued command tag number of the target data storage device. Now the I/O processing module stores the I/O descriptor in the memory module. After retrieving the I/O descriptor from the memory module to generate the I/O command, the controller module transmits the I/O command to the target data storage device. After the controller module receives the information packet with the queued command tag number and the second connection request data frame with the device ID number from the data storage device, the controller module can calculate the I/O descriptor index number according to the device ID number and the queued command tag number.

According to an embodiment of the invention, the indexing method is used for a data storage system, wherein the invention comprises a plurality of data storage devices. First of all, the I/O processing module, according to the target data storage system, generates the I/O descriptor and the I/O descriptor index number corresponding to the I/O descriptor, wherein the I/O descriptor index number is corresponding to the ID device number and the queued command tag number. Then, the I/O processing module stores the I/O descriptor. After transmitting the I/O command to the target data storage device, the controller module receives the information packet with the queued command tag number and the second connection request data frame with the device ID number from the target data storage device. Finally, the controller module calculates the I/O descriptor index number according to the device ID number and the queued command tag number.

Thereby, according to the invention, the indexing device and method calculate the I/O descriptor index number corresponding to the I/O descriptor according to the information packet with the queued command tag number and the second connection request data frame with the device ID number. Moreover, after receiving the I/O response, the data storage system can rapidly index the I/O descriptor corresponding to the I/O response.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention is to provide an indexing device and method for a data storage system. According to the information packet with the queued command tag number and the second connection request data frame with the device ID number, the invention calculates the I/O descriptor index number corresponding to the I/O descriptor. Therefore, after receiving the I/O response, the data storage system can quickly index the I/O descriptor corresponding to the I/O response. An embodiment of the invention explains sufficiently the features, spirit, advantages, and the convenient implementation of it.

Figure 1:
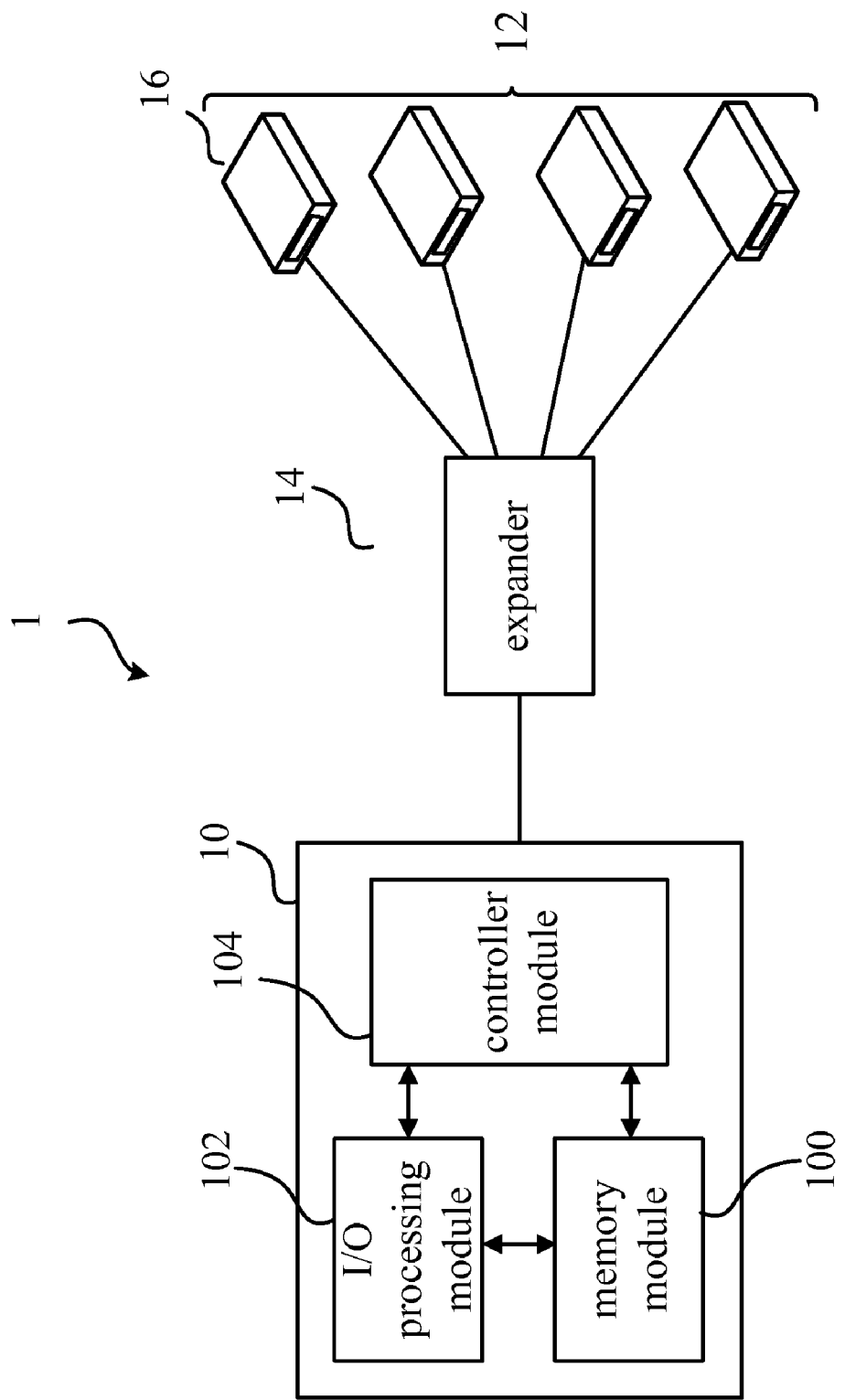
FIG. 1 illustrates a block diagram of an indexing device according to an embodiment of the invention.

Please refer to FIG. 1. FIG. 1 shows a functional block diagram of an indexing device 10 according to an embodiment of the invention. In this embodiment, the indexing device 10 is used as a data storage system 1, and the data storage system 1 comprises a plurality of data storage devices 12. In actual applications, the data storage system 1 can be a SAS data storage system, but not limited to it. Additionally, each of the data storage devices 12 is either a SAS data storage device or a SATA data storage device. For example, the data storage system 1 can be SAS RAID system, and the data storage devices 12 can comprise a SAS hard drive and/or a SATA hard drive.

As shown in FIG. 1, the indexing device 10 comprises a memory module 100, an I/O processing module 102, and a controller module 104. In actual applications, the data storage devices 12 can be connected to the controller module 104 via a SAS expander 14.

In an embodiment, the I/O processing module 102, according to a target data device 16, generates the I/O descriptor and the I/O descriptor index number corresponding to the I/O descriptor, wherein the I/O descriptor index number is corresponding to the device ID number and the queued command tag number of the target data storage device 16. According to the SAS standard, the device ID number can be the SAS address of the target data storage device 16, but not limited to it.

After that, the I/O processing module 102 can store the I/O descriptor in the memory module 100. Moreover, after retrieving the I/O descriptor from the memory module 100 to generate an I/O command, the controller module 104 transmits the I/O command to the target data storage device 16. In actual applications, when the controller module 104 transmits the I/O command to the target data storage device 16, the controller module 104 can send the first connection request data frame with the device ID number to the target data storage device 16, so as to establish a first connection between the controller module 104 and the target data storage device 16. Thereby the controller module 104 can transmit the I/O command via the first connection. Actually, before transmitting the first connection request data frame, the controller module 104 can write the device ID number into the specific location of the first connection request data frame, but not limited to it.

In actual applications, the target data storage device 16 can buffer N queued I/O commands, where N is a positive integer. On the other hand, the target data storage device 16, according to an algorithm, executes the sequences of N queued I/O commands so as to enhance the data processing efficiency. For example, the target data storage device 16 can be a Native Command Queuing (NCQ) SATA data storage device, but not limited to it. As explained above, the queued command tag number can correspond to one of the N queued I/O commands (such as the I/O command). Therefore, the queued command tag number is an integer between 0 and N−1.

In actual applications, after executing the I/O command, the target data storage device 16 transmits an information packet to the controller module 104, so as to show the target data storage system 16 is ready for executing the following processing procedures, such as DMA and so on, where the information packet comprises the queued command tag number. Actually, in the SATA standard, the information packet can be a DMA setup Frame Information Structure (FIS), but not limited to it. And then, the target data storage device 16 can transmit a second connection request data frame to the controller module 104, so as to establish the second connection between the controller module 104 and the target data storage device 16. Thereby, the target data storage device 16 transmits the I/O response corresponding to the I/O command to the controller module 104 via the second connection, where the second connection request data frame comprising the device ID number.

After receiving the information packet with the queued command tag number and the second connection request data frame with the device ID number from the target data storage device 16, the controller module 104 can calculate the I/O descriptor index number based on the device ID number and the queued command tag number. In actual applications, the I/O descriptor index number can be calculated by the device ID number multiplying by N and adding the queued command tag number, but not limited to it. After this, the controller module 104 can further index the I/O descriptor based on the I/O descriptor index number. Then the controller module 104, according to the I/O response and the I/O descriptor, can execute the following I/O processing procedures, such as DMA and so on.

Thereby, when the data storage system receives the I/O response, it can readily index the I/O descriptor corresponding to the I/O response, so as to enormously enhance the systemic efficiency.

Figure 2:
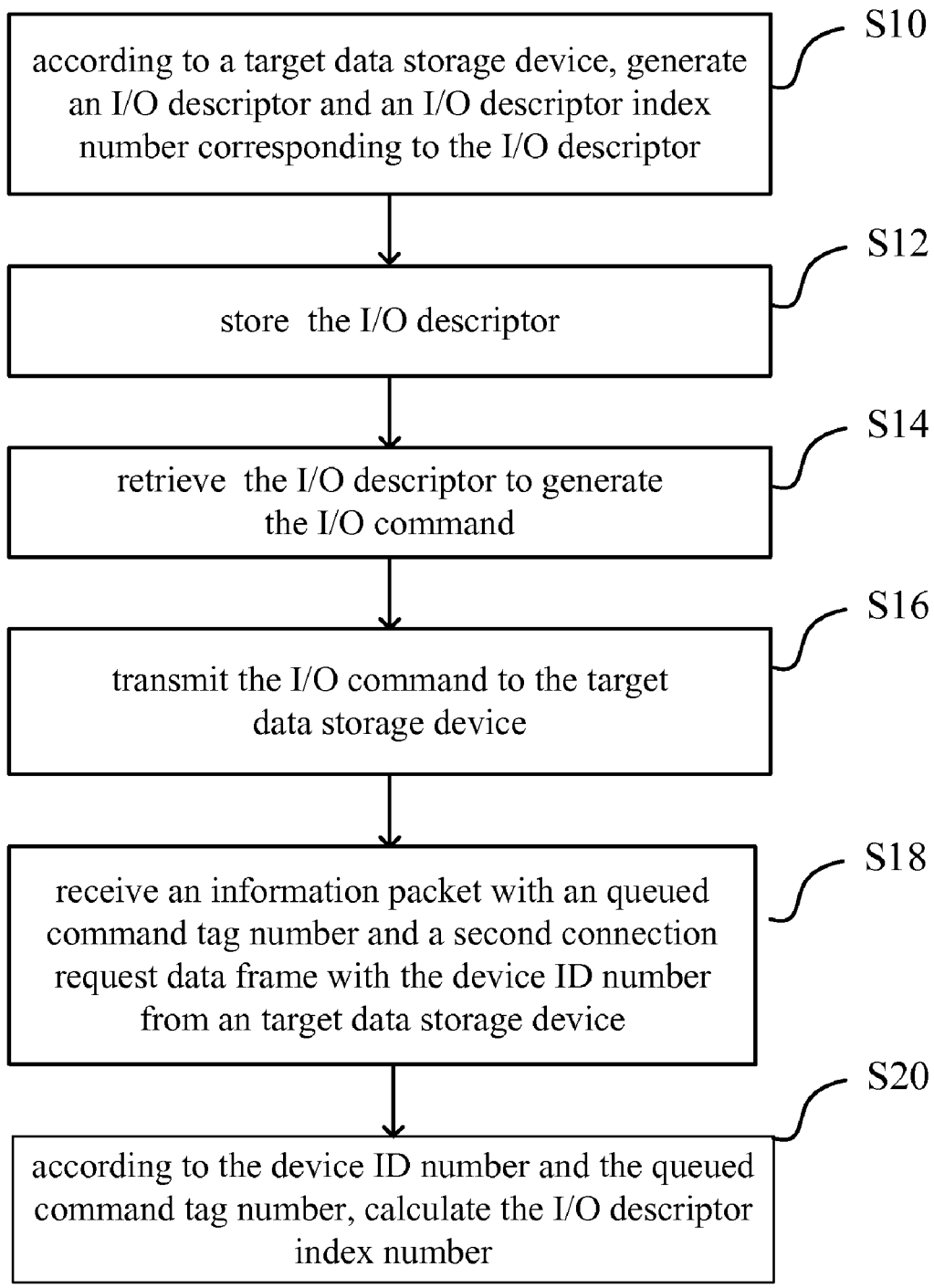
FIG. 2 illustrates a flow chart of an indexing method according to another embodiment of the invention.

Please refer to the FIG. 2 and FIG. 1. FIG. 2 illustrates a flow chart of an indexing method according to another embodiment of the invention. In this embodiment, the indexing method is used for the data storage system 1, and the data storage system 1 comprises a plurality of data storage devices 12. In actual applications, the data storage system 1 can be a SAS data storage system, but not limited to it. Additionally, each of the data storage devices 12 is either a SAS data storage device or a SATA data storage device. For example, the data storage system 1 can be a SAS RAID system, and the data storage device 12 can comprise SAS hard drive and/or SATA hard drive.

As shown in FIG. 2, we see how the indexing method works according to an embodiment of the invention. First of all, the method performs step S10, the I/O processing module, according to the target data storage device 16, generates an I/O descriptor and an I/O descriptor index number corresponding to the I/O descriptor, wherein the I/O descriptor index number is corresponding to a device ID number and a queued command tag number corresponding to the target data storage device 16. According to the SAS standard, the device ID number is the SAS address of the target data storage device 16, but not limited to it.

The indexing method performs step S12 for storing the I/O descriptor. And then, the indexing method performs step S14 for retrieving the I/O descriptor so as to generate an I/O command. After that, the indexing method performs step S16 for transmitting the I/O command to the target data storage device 16. In actual applications, the indexing method performs step S16, which first transmits a first connection request data frame with the device ID number to the target data storage device 16 so as to establish the first connection and transmit the I/O command via the first connection. Actually, before transmitting the first request data frame, the device ID number can be written in a specific location of the first connection request data frame, but not limited to it.

In actual applications, the target data storage device 16 can buffer N queued I/O commands, where N is a positive integer. On the other hand, the target data storage device 16, according to an algorithm, decides the implementing sequences of N queued I/O commands for enhancing the data processing efficiency. For instance, the target data storage device 16 can be a NCQ SATA data storage device, but not limited to. As indicated above, the queued command tag number can be corresponding to one of N queued I/O commands (such as the I/O command), so the queued command tag number is an integer between 0 and N−1.

Thereon, the indexing method performs step S18. The target data storage device receives the information packet with the queued command tag number and the second connection request data frame with the device ID number. In actual applications, the information packet shows the target data storage device 16 ready for executing the following I/O processing procedures, wherein the I/O response corresponding to the I/O command is received from the target data storage device 16 via the second connection.

Finally, the indexing method performs step S20. The controller module calculates the I/O descriptor index number according to the device ID number and the queued command tag number. In actual applications, the I/O descriptor index number is calculated by multiplying the device ID number by N and adding the queued command tag number, but not limited to it.

In comparison with prior arts, the indexing device and method for a data storage system, according to the invention, calculates the I/O descriptor index number corresponding to the I/O descriptor based on the information packet with the queued command tag number and the second connection request data frame with the device ID number. Thereby, after receiving an I/O response, the data storage system can index rapidly the I/O descriptor corresponding to the I/O response.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An indexing device for a data storage system which comprises a plurality of data storage devices, the indexing device comprising:
    a memory module;
    an I/O processing module, according to a target data storage device, for generating an I/O descriptor and an I/O descriptor index number corresponding to the I/O descriptor, wherein the I/O descriptor index number is corresponding to a device ID number and a queued command tag number of the target data storage device, the I/O processing module storing the I/O descriptor in the memory module, wherein the target data storage device is capable of buffering N queued I/O commands, where N is a positive integer, and the queued command tag number is an integer between 0 and N−1; and
    a controller module for generating an I/O command by retrieving the I/O descriptor from the memory module and transmitting the I/O command to the target data storage device;
    wherein after receiving from the target data storage device an information packet with the queued command tag number and a second connection request data frame with the device ID number, the controller module calculates the I/O descriptor index number by multiplying the device ID number by N and adding the queued command tag number.

2. The indexing device of claim 1, wherein the controller module sends a first connection request data frame with the device ID number to the target data storage device, so as to establish a first connection between the controller module and the target data storage device, and then transmits the I/0 command to the target data storage device via the first connection.

3. The indexing device of claim 1, wherein the target data storage device transmits the second connection request data frame to the controller module, so as to establish a second connection between the controller module and the target data storage device, and transmits an I/O response corresponding to the I/O command to the controller module via the second connection.

4. The indexing device of claim 1, wherein the data storage system is a SAS data storage system.

5. The indexing device of claim 1, wherein the data storage devices are connected to the controller module by at least one SAS expander.

6. The indexing device of claim 1, wherein each of the data storage devices is either a SAS data storage device or a SATA data storage device.

7. The indexing device of claim 1, wherein the target data storage device is a SATA data storage device.

8. The indexing device of claim 1, wherein the target data storage device has a native command queuing function.

9. An indexing method for a data storage system, which comprises a plurality of data storage devices, the indexing method comprising steps of:
    (a) according to a target data storage device, generating an I/O descriptor and an I/O descriptor index number corresponding to the I/O descriptor, wherein the I/O descriptor index number is corresponding to a device ID number and a queued command tag number of the target data storage device, wherein the target data storage device is capable of buffering N queued I/O commands, where N is a positive integer, and the queued command tag number is an integer between 0 and N−1;
    (b) storing the I/O descriptor;
    (c) retrieving the I/O descriptor to generate an I/O command;
    (d) transmitting the I/O command to the target data storage device;
    (e) receiving, from the target data storage device, an information packet with the queued command tag number and a second connection request data frame with the device ID number; and
    (f) calculating the I/O descriptor index number by multiplying the device ID number by N and adding the queued command tag number.

10. The indexing method of claim 9, wherein step (d) comprises steps of:
    transmitting a first connection request data frame with the device ID number to the target data storage device, so as to establish a first connection; and
    transmitting the I/0 command to the target data storage device via the first connection.

11. The indexing method of claim 9, wherein the second connection request data frame is used for establishing a second connection, and an I/O response corresponding to the I/O command is received from the target storage device via the second connection.

12. The indexing method of claim 9, wherein the data storage system is a SAS data storage system.

13. The indexing method of claim 9, wherein each of the data storage devices is either a SAS data storage device or a SATA data storage device.

14. The indexing method of claim 9, wherein the target data storage device is a SATA data storage device.

15. The indexing method of claim 9, wherein the target data storage device has a native command queuing function.

* * * * *